Dec. 12, 1967 M. RINALDI 3,358,125

CIRCUIT FOR DISPLAYING THE DECIMAL LOCATION IN ELECTRONIC TYPE ARITHMETICAL COMPUTING DEVICES, PARTICULARLY IN CONNECTION WITH DIGITAL DATA READOUT DEVICES ON DECIMAL INDICATORS

Filed Oct. 14, 1964 2 Sheets-Sheet 1

INVENTOR

MASSIMO RINALDI

BY

Mason, Fenwick & Lawrence

ATTORNEYS

Dec. 12, 1967 M. RINALDI 3,358,125

CIRCUIT FOR DISPLAYING THE DECIMAL LOCATION IN ELECTRONIC TYPE ARITHMETICAL COMPUTING DEVICES, PARTICULARLY IN CONNECTION WITH DIGITAL DATA READOUT DEVICES ON DECIMAL INDICATORS

Filed Oct. 14, 1964 2 Sheets-Sheet 2

INVENTOR

MASSIMO RINALDI

BY

Mason, Fenwick & Lawrence

ATTORNEYS 3,358,125

CIRCUIT FOR DISPLAYING THE DECIMAL LOCATION IN ELECTRONIC TYPE ARITHMETICAL COMPUTING DEVICES, PARTICULARLY IN CONNECTION WITH DIGITAL DATA READOUT DEVICES ON DECIMAL INDICATORS

Massimo Rinaldi, Rome, Italy, assignor to Industria Macchine Elettroniche—I.M.E. S.p.A., Rome, Italy Filed Oct. 14, 1964, Ser. No. 403,853
Claims priority, application Italy, Mar. 13, 1964, 5,446/64
10 Claims. (Cl. 235—92)

The present invention relates to a circuit for displaying the decimal location in electronic arithmetical computing devices, particularly in connection with digital data readout devices on decimal indicators.

It occurs often of having to display the position of the decimals in the entry of digital data to be processed in an electronic computing device, and of having to display the decimal location in the result obtained by means of the computing device.

Digital data display devices on decimal indicators form the subject matter of other patent applications of the same applicant, said devices comprising a multiplicity of digital indicators particularly of the grouped digit type, which are sequentially energized and driven by a single matrix for decoding a decimal digit in binary coding of the 1–2–4–8 type to a decimal digit on ten wires. In the devices of this kind, a common electrode of the group digit indicators is sequentially driven by sequential scanning pulses of each indicator tube while the electrodes concerned with the same digits of all the tubes are parallel connected and driven by the aforesaid decoding matrix.

Particularly, in case of gas-type decimal indicator tubes, the anodes thereof are sequentially driven in correspondence with the readout of data on matrix registers of magnetic or electronic type.

One purpose of this invention is that of providing a circuit allowing decimal location to be shown by means of the energization of an indicator tube for the decimal point or other symbol of the decimal location, wherein the energization of the decimal point indicator tube will be effected in a suitable interval during the sequential scanning of the grouped digit indicator tubes.

Another purpose of the present invention is that of providing circuits allowing the location of the digital point to be automatically established when the digital data are entered into a computing device.

A further purpose of this invention is that of providing a circuit allowing the location of the decimal point to be automatically determined if multiplication or division operations are carried out, the result of which requires the decimal point location to be moved due to the fact that the decimal locations will increase or diminish according to the operation as carried out.

According to the present invention, an energizing circuit for the decimal indicators showing the location of the decimal point is provided, including means for obtaining the energization of said decimal indicators in a free interval of the scanning on the grouped digit decimal indicator tubes. This feature is convenient in the case when a single decoding matrix is wished to be used, but it will be understood that two independently energizable decoding matrices could be used, without departing from the scope of the present invention.

For determining the location of the decimal point during the data entry it is provided for using a counter with a numerical capacity corresponding to the number of the order locations of the digital data which can be entered or which can be displayed, the counting of said counter being caused to advance when digits or locations to decimals are entered. Also, a second reversible type counting circuit is provided, the counting of which will be changed when the second factor of an operation will be entered, said counting being caused to advance when said second factor is the second factor of a multiplication operation, or to count down if said second factor is the divisor in case of division operation.

Also means are provided for the automatic switching of the display of the decimal location controlled by either of said counters according to the display of said factors.

The present invention will be now described with reference to an embodiment thereof at present preferred, and with reference to the attached drawings, wherein.

Figure 1:
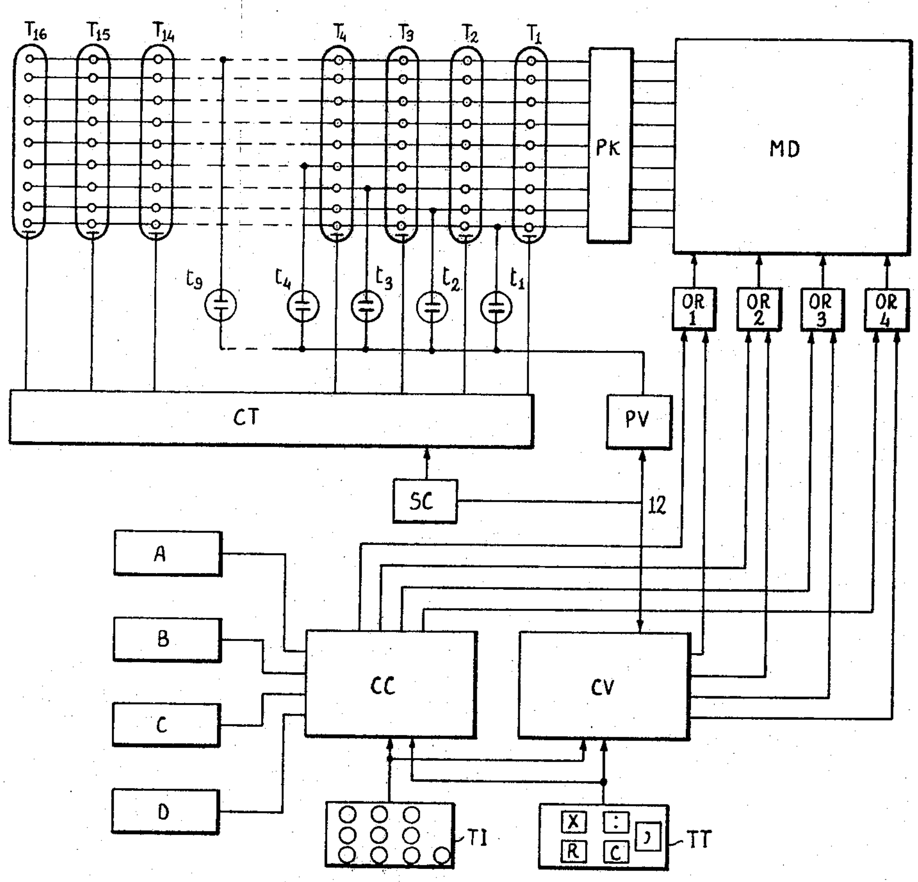
FIG. 1 shows a general block diagram of the circuit for displaying the decimal location in association to readout devices on decimal indicators.

With reference to FIG. 1, therein have been shown an array of decimal indicating tubes denoted by T1, T2 . . . T16. In this particular embodiment reference will be made to an arrangement of decimal indicators having sixteen cases or locations, but it will be understood that said number could be changed, by a person skilled in the art, by simple modifications of the circuits.

The indicating tubes T1 . . . T16 are provided with an anode constituting a common electrode, and with a set of cathodes. To each cathode corresponds a decimal digit 0 to 9. As described in another patent application of the same applicant, though the tube energizing circuits CT, an analysis or scanning of said tubes will be obtained for their sequential enabling. The circuits CT are associated to memories diagrammatically shown at A, B, C and D and to a scanning circuit shown by SC. The scanning circuit SC supplies a sequence of pulses for the sequential enabling of the anodes of the single tubes simultaneously with the enabling of the circuits reading out the decimal digits to be displayed on the indicators will be readout, said circuits being shown by the block CC including also the arithmetical computing circuit.

The outputs from the block CC are connected to a matrix MD for decoding the decimal digits in binary coding of the 1–2–4–8 type, to the decimal digits on ten wires. The outputs from the decoding matrix MD are connected to circuits PK supplying the lighting voltages for the indicator tubes. The circuits CT and the circuits CC are associated, respectively, to the previously cited memories which constitute registers of the computing device. The circuits CC are associated, respectively, also to a keyboard TT including control keys for the arithmetical operations, and to an entry keyboard TI. The control keyboard TT and the entry keyboard TI are connected also to the circuits for the display of the decimal points, denoted by the block CV. The outputs from the decimal point circuits CV are connected through gate circuits OR to the decoding matrix MD. The scanning circuit SC supplies: a pulse which enables the circuits CV to forward the signals determining the location of the decimals towards the decoding matrix, and pulses enabling the circuits PV which predispose the enabling of the tubes indicating the location of the decimals. As it will be noted, the indicator tubes of the decimal location are denoted by *t*1, *t*2, etc. One of the electrodes of said tubes is parallel connected and to the output from the circuits PV.

The other electrode of each tube is connected to the cathode of the tubes T1, T2 . . . corresponding to the digits "1," "2," etc., respectively. If by the circuits PK and the matrix MD one of the cathodes corresponding to the digits will be enabled when the anode of the tube *t*, the lighting will be obtained of the tube *t* corresponding to the particular cathode activated by the tubes T.

The decimal digits 1 to 9 determining the location of the decimals will be displayed during the time interval in which the tubes T are disabled, through the same decoding matrix MD used for the digital display by the decimal point circuits CV.

Figure 3:
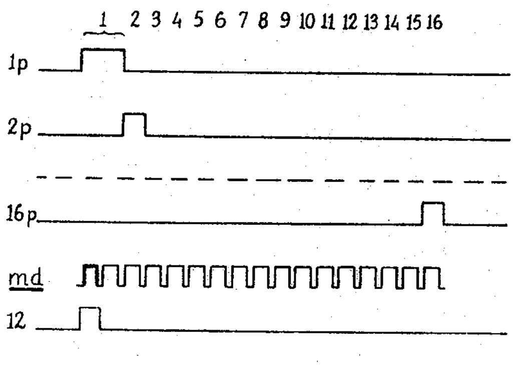
FIG. 3 shows wave forms associated to the operation of the circuits of the FIGS. 1 and 2.
Figure 2:
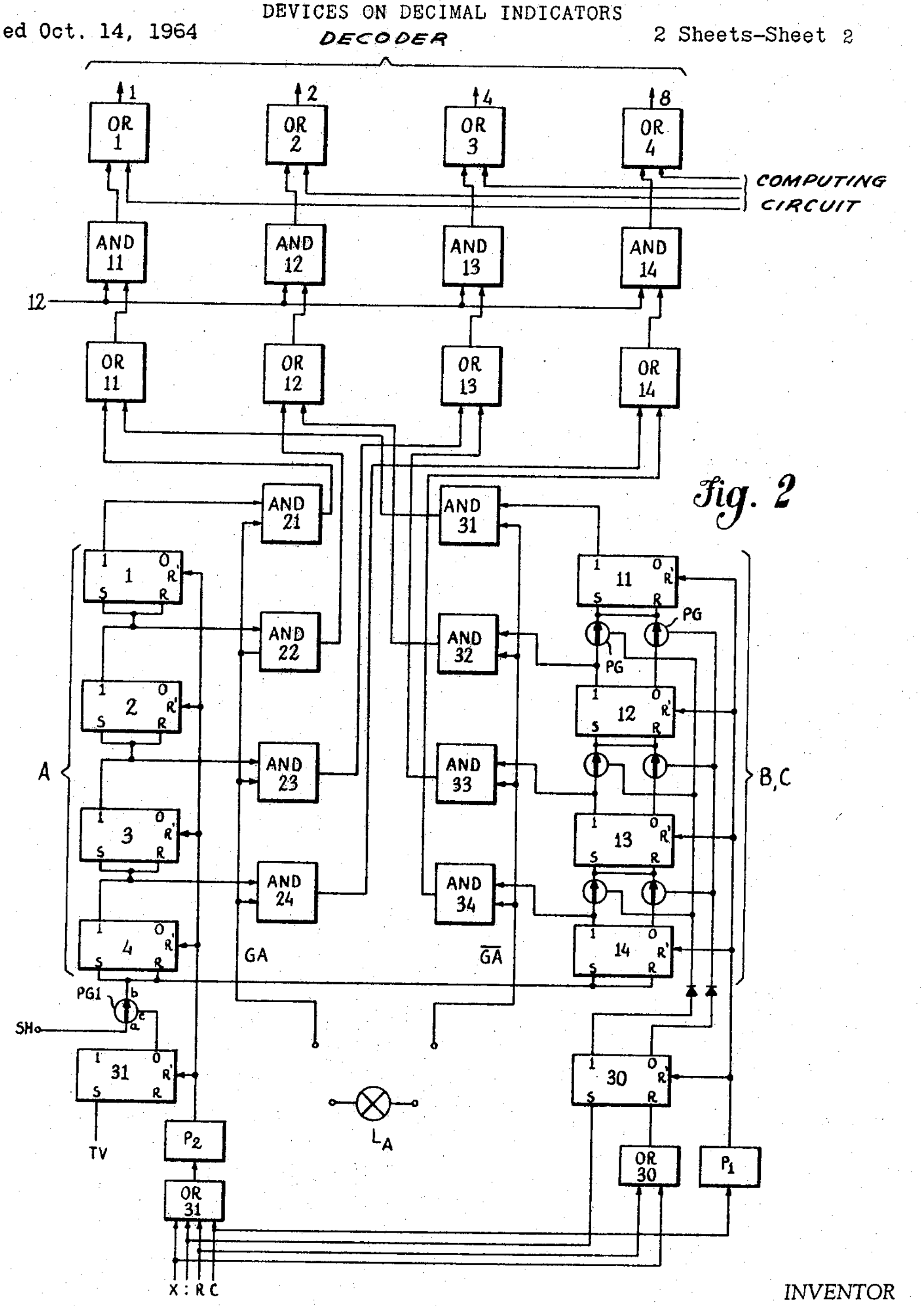
FIG. 2 shows a detailed block diagram of the circuits for indicating the decimal location of an entry register and of a register operating as a counter or as a totalizer.

With reference, now to FIGURES 2 and 3, the circuits for inserting and determining the display of the decimal locations will be described in detail.

In FIGURE 2 a counter A and a counter BC have been shown. The counter A concerns the display of the decimal location for the memory A or entry register, and the counter BC concerns the display of the decimal location for the memories B, C being the totalizing register and the counting register, respectively.

The counter A includes the flip-flops FF1, FF2, FF3 and FF4 connected as a counter in a conventional way. The true outputs from said flip-flops are connected to one of the inputs of the coincidence gate circuits AND21, AND23, and AND24. The other input of the last cited coincidence circuits is connected to a common conductor whereon appears an enabling signal GA, which controls the display of the decimal location for the memory A.

The outputs from the gate circuits AND21 . . . AND24, are connected to one of the inputs of the gate circuits OR11, OR12, OR13 and OR14. The outputs from said gate circuits OR, last cited, are connected to one of the inputs of the coincidence circuits AND11, AND12, AND13 and AND14.

The other inputs of these coincidence circuits are connected to a common conductor to which arrives an enabling pulse for the display of the decimal location. The outputs from the coincidence gate circuits AND11 . . . to AND14 are connected to one of the inputs of the gate circuits OR1, OR2, OR3 and OR4, to the other inputs of which arrive coded digital signals coming from the computing circuits.

The outputs from the gate circuits OR1 . . . OR4 are connected to respective inputs 1, 2, 4, 8 of the decoding matrix MD.

The counter consisting of the flip-flops FF1 . . . FF4 is driven by the output *b* of the gate circuit PG1, to the input *a* of which come the counting advance pulses. The gate circuit PG1 is enabled when its control input *c* is at the ground potential, i.e., when the flip-flop FF31 is in its true state. The flip-flops of the described counter, and the flip-flop FF31 can be reset by a pulse applied to their input R'. This reset pulse is generated by the pulse forming circuit P2 which is driven by the gate circuit OR31. The gate circuit OR31 has four inputs which are connected to the predisposing key for the multiplication operation, to the predisposing key for the division operation, to the re-entry key and to the clearing key, respectively. These inputs are denoted by the corresponding symbols in FIG. 2. Therefore, a signal coming from one of these controls triggers the circuit P2 which cancels the counter content carrying again the flip-flop FF31 to its false state.

For the display of the decimal location with respect to the memories B and C, a reversible counter BC is provided, including the flip-flops FF11, FF12, FF13 and FF14; as it is known, in case of reversible counters, these flip-flops are coupled through gate circuits PG allowing the flip-flops to be driven by the false or true output of the preceding flip-flop of the chain, according to a control flip-flop, which in this case is the flip-flop FF30, set true or false respectively. Therefore, if the flip-flop FF30 is set false, the counter BC will be conditioned for its direct advance, i.e., towards the same direction as the counter A. The input to the reversible counter BC is connected to the same input terminal as the counter A.

The true outputs from the flip-flops FF11 . . . FF14, are connected to one of the inputs of the coincidence gate circuits AND31, AND32, AND33, and AND34, respectively. The other inputs of these coincidence gate circuits are connected together and to a terminal for applying an enabling voltage of the display of the decimal location for the memories B and C, denoted by GA. This enabling voltage is the complement to the enabling voltage GA controlling the display of the decimal location for the memory A.

The enabling voltage GA and the enabling voltage $\overline{GA}$ can be generated, for instance, by the energizing or non-energizing of an indicator of the display of the content of the memory A. The outputs from the gate circuits AND31 . . . AND34 are connected to the previously cited gate circuits OR11, OR12, OR13 and OR14, respectively. The reversible counter BC can be reset by a cancellation pulse generated by the pulse forming circuit P1, the input of which is connected to the input of the gate circuit OR31, to which is connected the clear control denoted by C. As aforesaid, the flip-flop FF30 controls the direction of advance of the reversible counter BC. The set input S of the flip-flop is connected to the control terminal of the predisposition of the division operation. The reset input R of the flip-flop FF30 is connected to the output from the gate circuit OR30. The two inputs of the gate circuit OR30 are connected to the inputs of the gate circuit OR31 which are in turn connected to the key for predisposing the multiplication operation, and to the re-entry key denoted by R, respectively.

The operation of the circuit according to the present invention is as follows: The circuit SC generates a sequence of pulses for predisposing the energization of the decimal indicator tubes T1, T2 . . . T16, and these pulses are shown by 1*p*, 2*p* . . . 16*p* in FIG. 3. As it will be noted, the pulse 1*p* has a duration double than the duration of the other pulses. In register with each pulse 1*p* . . . 16*p* to the decoding matrix MD arrive the binary code signals for the display of the digits contained in that memory, among the memories A, B, C and D, which are under readout operation, and concerned with each of the digital indicator tubes. These signals are diagrammatically shown in FIG. 3 on the line *md* of said figure.

In correspondence with the first part of the pulse *lp*, the generator SC supplies also a pulse "12" for enabling the circuits for the decimal location display. The instant when the information will be displayed by the circuits of the decimal location, is shown by the pulse portion shown by a more marked line on the waveform *md*. Particularly, the display of the first decimal digit will occur at the instant which can be expressed by the logical product 1*p*.12, while the decimal location is displayed at the instant 1*p*.12.

As it will be remarked by reference to FIGURES 1 and 2, the pulse "12" controls the circuit PV for predisposing the energization of the decimal location indicator tubes.

The counting present in the counters of the decimal location will determine what of the indicator *t*1, *t*2 . . . *tq* will have to light, said counting from the binary coding of the counter being transduced into decimal digits by the matrix MD. The display for the memory A or the memories B, C is controlled as aforesaid by the gate circuits AND21 . . . AND24, or AND31 . . . AND34, respectively.

The counting change of the counters pertinent to either memory A or memories B and C is controlled by the terminal S*h* coupled to the entry keyboard TI and connected to the output from a Schmitt trigger (not shown). The insertion of the decimal location is controlled since the flip-flop FF31 is in true state, this being obtained by sending a pulse to the terminal TV through the keyboard TT including an insertion key for the decimal location. When a decimal digit is to be inserted after having entered the most significant digits, said inserting key for the decimal location will be depressed and the decimals will be entered. The number of entries of decimals will correspond to the number of shifts effected in the memory after the depression of the key TV, i.e., to the number of decimals entered into the counters A and BC the inputs of which are parallel connected. Now, it is to be remembered that in the multiplication on two non integer numbers, the number of the decimal locations of the result is the sum of the numbers of decimal locations of the two factors. In case of division, the number of the decimals of the quotient corresponds to the difference between the number of decimals of the dividend and the number of decimals of the divisor. Of course, in case of division operation, the number of decimals of the dividend must be greater than, or equal to, the number of decimals of the divisor.

The information that a multiplication or a division has been carried out, passes to the display circuits of the decimal location through the inputs of the gate circuit OR31 marked by the multiplication or division symbols respectively.

In case of re-entry, the terminal of which is shown at R, the counter of the memories B and C is predisposed for the addition. The terminal C is connected to a key which controls the cancellation of the content of the memory registers, of the counters of the decimal location and of flip-flops for inserting the decimal location and for controlling the direction of advance of the reversible counter.

The present invention has been described with reference to one embodiment thereof which is at present preferred, but it will be understood that thereto changes and modifications could be brought by a skilled person in the art, without departing from the scope of the present industrial privilege.

I claim:

1. A circuit for indicating the decimal location in arithmetical computing electronic type devices, particularly in connection with readout devices for digital data on decimal indicators, characterized in comprising a set of indicator tubes for the decimal locations; a first counter and a second counter of the decimal locations, operatively coupled to said tubes; means for entering the factors, operatively coupled to the inputs of said counters in order to count the number of entered decimals; said first cited counter being a unidirectional counter and second cited counter being a reversible counter; and means to change the direction of counting of said second counter in order to increase or decrease its content through the number of decimal locations of a second factor according to the latter being the second factor of a multiplication operation or of a division operation.

2. A circuit as claimed in claim 1, characterized in that said first counter has its input operatively connected to a keyboard for entering the digital data, in parallel with the input of said second reversible counter; said first counter and said second counter having their coded outputs connected to gate coincidence circuits allowing the display of the content of the first counter together with the display of a first entry memory register, and the display of the content of said second counter together with the display of the content of a second and a third memory register operating as a totalizer or as a counter respectively.

3. A circuit as claimed in claim 2, characterized in that the content of said counters present at the outputs from said coincidence gate circuits, will be displayed by means of the indicator tubes through a decoding matrix for converting the binary code digits of the contents of said counters to the decimal digits on ten wires, the decimal digit displayed through said matrix corresponding to the location order of the decimals.

4. A circuit as claimed in claim 3, characterized in that said decoding matrix is the same decoding matrix used for the sequential display of the content of the memory registers.

5. A circuit as claimed in claim 2 characterized in that the display of the location of the decimals is effected in a suitable interval free from the display of digital data contained in the memory registers.

6. A circuit as claimed in claim 2, characterized in including means for switching the display of the first cited counter or of the second cited counter, said means being controlled by the energization or by the de-energization of an indicator of the readout of the content of the first memory register.

7. A circuit as claimed in claim 3, characterized in that the indicator tubes for the decimal location are luminous gas discharge tubes provided with two electrodes respectively, the first electrodes of said tubes being parallel connected and to the output from a predisposition circuit for their energization; the second electrodes of said tubes being bi-univocally connected to the digital outputs from said decoding matrix, so that the lighting of a single tube will be obtained in correspondence with the display of a decimal digit 1 to 9 forwarded through the decoding matrix coupled to the aforesaid counters of the decimal locations, the lighting of said tube forming the display of the symbol of the decimal locations at the location corresponding to the aforesaid decimal digit determined by the count contained in that counter the display of which is enabled.

8. A circuit as claimed in claim 1, characterized in that said means for changing the direction of advance of said second counter include a flip-flop circuit the state of which is determined by the actuation of controls for carrying out the arithmetical operations.

9. A circuit as claimed in claim 1, characterized in that it includes means for cancelling the content of said counters, and for restoring the initial conditions of said changing means for the direction of advance of the reversible counter, coupled to a cancellation control of the content of the memory registers.

10. A circuit as claimed in claim 2 characterized in that the input of said two counters is connected to the output from a gate circuit, provided with an input and a control input; said first cited input being operatively connected to the keyboard for entering the digital data, and the control input to the keyboard for entering the digital data, and the control input being coupled to a flip-flop circuit which is driven in the enabling state of said gate circuit following the operation of a control for the insertion of the decimal location.

References Cited

UNITED STATES PATENTS

| | | | |
|---|---|---|---|
| 2,936,956 | 5/1960 | Kassel | 235—160 |
| 3,021,066 | 2/1962 | Martens | 235—160 |
| 3,022,006 | 2/1962 | Alrich | 235—160 |

MAYNARD R. WILBUR, *Primary Examiner.*

G. J. MAIER, *Assistant Examiner.*